US009531617B2

(12) United States Patent
Karame

(10) Patent No.: US 9,531,617 B2
(45) Date of Patent: Dec. 27, 2016

(54) SECURING INTERNET MEASUREMENTS USING OPENFLOW

(71) Applicant: NEC Europe LTD., Heidelberg (DE)

(72) Inventor: Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/766,982

(22) PCT Filed: Feb. 21, 2014

(86) PCT No.: PCT/EP2014/053448
§ 371 (c)(1),
(2) Date: Aug. 11, 2015

(87) PCT Pub. No.: WO2014/128265
PCT Pub. Date: Aug. 28, 2014

(65) Prior Publication Data
US 2016/0014007 A1    Jan. 14, 2016

(30) Foreign Application Priority Data
Feb. 21, 2013  (EP) ..................................... 13156085

(51) Int. Cl.
*H04L 12/26* (2006.01)
*H04L 29/06* (2006.01)
(Continued)

(52) U.S. Cl.
CPC ........... *H04L 43/10* (2013.01); *H04L 41/0893* (2013.01); *H04L 43/0864* (2013.01);
(Continued)

(58) Field of Classification Search
CPC .......... H04L 43/00; H04L 43/04; H04L 43/06; H04L 43/065; H04L 43/08; H04L 43/0852; H04L 43/0864; H04L 43/087; H04L 43/10; H04L 43/106; H04L 45/00; H04L 45/026; H04L 45/121; H04L 45/123; H04L 45/124; H04L 45/14; H04L 45/26; H04L 45/3065
See application file for complete search history.

(56) References Cited

U.S. PATENT DOCUMENTS

2015/0189619 A1* 7/2015 Kalliola .................... G01S 1/02
455/456.1

OTHER PUBLICATIONS

Karame G O et al: "On the Security of End-to-End Measurements Based on Packet-Pair Dispersions", IEEE Transactions on Information Forensics and Security, IEEE, Piscataway, NJ, US, vol. 8, No. 1, Oct. 26, 2012 (Oct. 26, 2012), pp. 149-162, XP011487922, the whole document.

(Continued)

*Primary Examiner* — Ashley Shivers
(74) *Attorney, Agent, or Firm* — Leydig, Voit & Mayer, Ltd.

(57) ABSTRACT

A method of performing secure network measurements between a verifier and a prover includes generating, by the verifier, probe request packets destined to the prover, and echoing, by the prover, corresponding probe reply packets back to the verifier. The path between the verifier and the prover traverses a network domain that includes at least one software defined network (SDN) controller and one or more SDN switches. Tampering of the network measurements by the prover is prevented by selectively influencing the probe request packets sent by the verifier or the probe reply packets sent by the prover according to programmable packet forwarding rules that the SDN controller implements on the SDN switches.

17 Claims, 2 Drawing Sheets

(51) Int. Cl.
　　　*H04L 12/715*　　　(2013.01)
　　　*H04L 12/947*　　　(2013.01)
　　　*H04L 12/24*　　　(2006.01)
　　　*H04L 12/721*　　　(2013.01)

(52) U.S. Cl.
　　　CPC ............ *H04L 43/106* (2013.01); *H04L 45/38* (2013.01); *H04L 45/64* (2013.01); *H04L 49/25* (2013.01); *H04L 63/12* (2013.01); *H04L 63/126* (2013.01)

(56) References Cited

OTHER PUBLICATIONS

Guang Yao et al: "Source address validation solution with OpenFlow/NOX architecture", Network Protocols (ICNP), 2011 19th IEEE International Conference on, IEEE, Oct. 17, 2011 (Oct. 17, 2011), pp. 7-12, XP032028988, the whole document.

\* cited by examiner

SECURING INTERNET MEASUREMENTS USING OPENFLOW

CROSS-REFERENCE TO PRIOR APPLICATIONS

This application is a U.S. National Phase application under 35 U.S.C. §371 of International Application No. PCT/EP2014/053448, filed on Feb. 21, 2014, and claims benefit to European Patent Application No. EP 13156085.6, filed on Feb. 21, 2013. The International Application was published in English on Aug. 28, 2014 as WO 2014/128265 under PCT Article 21 (2).

FIELD

The present invention relates to a method and a system for providing encrypted data for searching of information therein. The present invention relates to a method of performing secure network measurements between a verifier and a prover, wherein said verifier generates probe request packets destined to said prover and said prover echoes its probe reply packets back to said verifier. Furthermore, the present invention relates to a system for performing secure network measurements between a verifier and a prover, wherein said verifier is configured to generate probe request packets destined to said prover and said prover is configured to echo its probe reply packets back to said verifier.

BACKGROUND

Network measurements are becoming crucial for the operation and security of the Internet, and of several services including for instance application-level multicast trees, content distribution and peer-to-peer (P2P) systems. Numerous tools for estimating various aspects of network performance have been proposed, among them, for instance, with regard to bandwidth measurements: Sprobe (see for reference S. Sariou, P. Gummadi and S. Gribble: "SProbe: A Fast Technique for Measuring Bottleneck Bandwidth in Uncooperative Environments", in INFOCOM, 2002), with regard to latency: traceroute (see for reference ftp://ftp.ee.lbl.gov/traceroute.tar.gz) or ping (see for reference ftp://ftp.arl.mil/pub/ping.shar), or with regard to link quality: mtr (see for reference http://www.bitwizard.nl/mtr/).

Given the current trends in designing a secure next-generation Internet, the design of current measurement tools is showing the limits of foresight in the design/deployment of these tools:

First of all, current network measurement tools were developed without prior security considerations, which makes them vulnerable to external and internal attacks ranging from IP spoofing to delay and rushing attacks. Since the measurements are performed end-to-end, the end-hosts might not be able to distinguish these attacks from "authentic" measurements. These security vulnerabilities might also affect the operation of the applications that make use of these measurement tools, thus increasing the gain of the attacker. Some of these problems are described in detail in M. A. Kaafar, L. Mathy, C. Barakat. K. Salamatian, T. Turletti, and W. Dabbous: "Securing Internet Coordinate Embedding Systems", in Proceedings of ACM SIGCOMM, 2007, or also in G. Karame, B. Danev, C. Bannwart, and S. Capkun: "On the Security of End-to-End Measurements based on Packet-Pair Dispersions", in IEEE Transactions on Information Forensics & Security (TIFS), 2013.

Secondly, there are no implicit trust assumptions as current network measurement tools implicitly assume that both end-hosts are honest and behave "correctly". However, in many situations, end-hosts might have considerable incentives to cheat and increase their advantage in the network (e.g., free-riding). In this regard, references made, e.g., to A. Walters, D. Zage and C. Nita-Rotaru: "A Framework for Mitigating Attacks Against Measurement-Based Adaptation Mechanisms in Unstructured Multicast Overlay Networks", in ACM/IEEE Trans, on Networking, 2007. Indeed, if the endpoints misbehave and do not obey the measurement protocol, the estimated end-to-end metric will not reflect the authentic state of the network.

Until recently, the end-to-end principle (for reference, see J. H. Saltzer, D. P. Reed and D. D. Clark: "End-to-End Arguments in System Design", in ACM Transactions on Computer Systems, 1984) has provided a justifiable rationale for moving functions closer to the end-hosts and has shaped the way the current Internet is designed. The true leverage of the end-to-end argument was implicitly a global architecture comprising a "naive" network and "smart" applications that do not require functionality from the switching elements deployed within the network. Given this, the design of network measurements tools equally adopted the end-to-end principle.

SUMMARY

In an embodiment, the present invention provides a system and a method of performing secure network measurements between a verifier and a prover. The verifier generates probe request packets destined to the prover. The prover echoes corresponding probe reply packets back to the verifier. The path between the verifier and the prover traverses a network domain that includes at least one software defined network (SDN) controller and one or more SDN switches. Tampering of the network measurements by the prover is avoided by selectively influencing the probe request packets sent by the verifier and/or the probe reply packets sent by the prover according to programmable packet forwarding rules that the SDN controller implements on the SDN switches.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
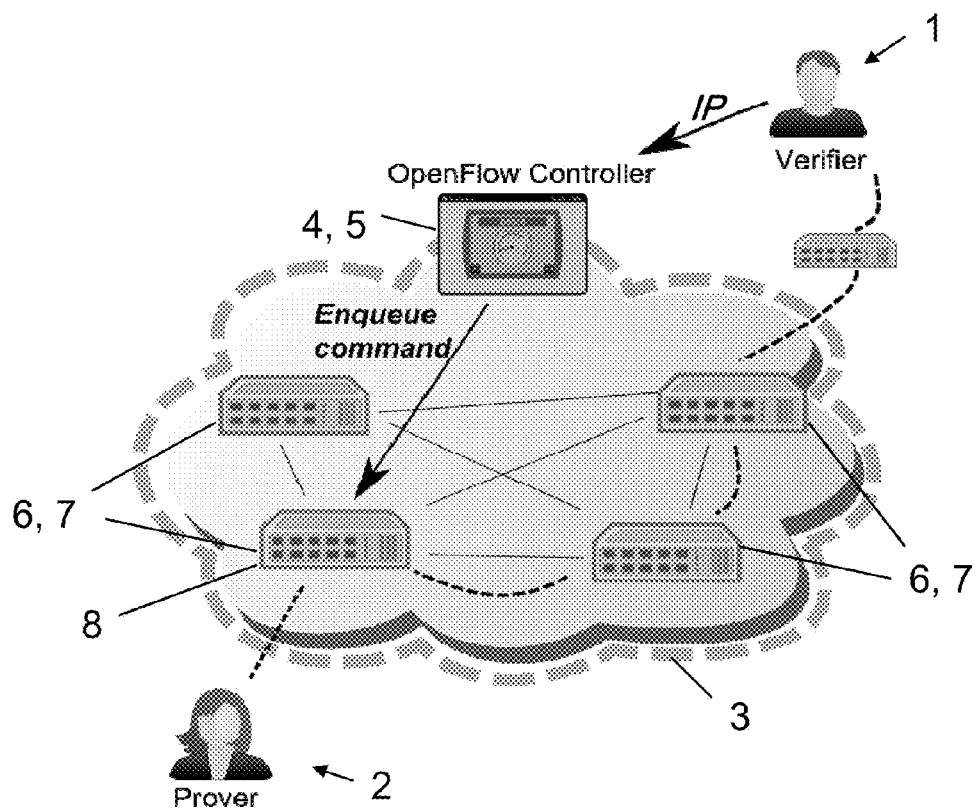
FIG. 1 shows a schematic view illustrating an application scenario of secure bottleneck bandwidth estimation in accordance with an embodiment of the invention.

Given the above obstructions, it is an objective of the present invention to improve and further develop a method and a system for performing secure network measurements in such a way that the degree of security and reliability of the measurements, in particular in view of network entities tampering with the measurements, is enhanced.

In accordance with an embodiment of the invention, a method of performing secure network measurements between a verifier and a prover includes generating, by the verifier, probe request packets destined to the prover, and echoing, by the prover, corresponding probe reply packets back to the verifier. The path between the verifier and the prover traverses a network domain that includes at least one software defined network (SDN) controller and one or more SDN switches. Tampering of the network measurements by the prover is prevented by selectively influencing the probe request packets sent by the verifier or the probe reply packets sent by the prover according to programmable packet forwarding rules that the at least one SDN controller implements on the one or more SDN switches.

Furthermore, in accordance with an embodiment of the invention, a system, wherein the verifier is configured to generate probe request packets destined to the prover and the prover is configured to echo corresponding probe reply packets back to the verifier, includes at least one software defined network (SDN) controller and one or more SDN switches located in a network domain through which traverses a path between the verifier and the prover. The SDN controller is configured to implement on the SDN switches programmable packet forwarding rules to prevent tampering of the network measurements by the prover by selectively influencing the probe request packets sent by the verifier or the probe reply packets sent by the prover according to the programmable packet forwarding rules.

According to the present invention, it has been recognized that a higher degree of security and reliability of the measurements can be achieved by relying on intelligence of SDN network components implemented in a network domain between the verifier and the prover. More specifically, the network measurements are conducted by making use of and with support from the smartness as provided by an SDN controller that selectively implements programmable packet forwarding rules on SDN switches within the network domain. The packet forwarding rules are designed that they selectively influence the probe request packets sent by the verifier and/or the probe reply packets sent by the prover in such a way that the prover is disabled to tamper with the measurements. This is in strong contrast to solutions according to the prevalent end-to-end principle in which network measurements are conducted without any support from the network, i.e. in scenarios in which a "naïve" network just forwards probe packets in an unaware manner.

According to a preferred embodiment of the present invention, the programmable packet forwarding rules may be directed at selectively controlling the routing of the probe request packets sent by the verifier and/or the probe reply packets sent by the prover. This means that the paths the probe packets take on their way from the verifier to the prover, and reverse, may be specifically designed, for instance in such a way that the prover is not aware of the paths that are actually taken. Alternatively or additionally, the programmable packet forwarding rules may be directed at selectively controlling the temporal behavior of the probe request packets, for instance by artificially inserting packet delays the prover is not aware of.

In some embodiments of the invention, the network measurements include bottleneck bandwidth estimations. In this context, it may be provided that the verifier sends two equally sized probe request packets back to back to the prover and the prover echoes two equally sized probe reply packets back to the verifier, wherein the size of the probe reply packets is larger than the size of the probe request packets. Preferably, the size of the probe reply packets is chosen to be rather large (e.g., each packet having a size of 1.500 byte) in order to generate a high probability that these packets queue at the bottleneck link.

In accordance with a further preferred embodiment of the present invention, the SDN controller determines the SDN switch closest to the prover and propagates a packet forwarding rule to that SDN switch, which instructs that SDN switch to queue all probe reply packets that SDN switch receives from the prover. In other words, any delay, which probe requests that are received by that configured SDN switch may have, is removed, i.e. that configured SDN switch sends out the probe packets back to back.

In addition, the arrival times $t_1$, $t_2$ of the two probe reply packets at that configured SDN switch may be reported to the verifier. For instance, the SDN controller may request that the configured SDN switch forwards received probe packet-pairs, along with their received timestamps, $t_1$ and $t_2$, to the SDN controller, which may then automatically send $t_1$ and $t_2$ to the verifier.

According to a even further preferred embodiment of the present invention, it may be provided that the verifier, upon receiving the two probe reply packets from the prover, compares the observed dispersion between the two probe reply packets against the arrival times $t_1$, $t_2$ of the two probe reply packets at that SDN switch located closest to prover and having been programmed with the enqueue command, as described above. In case the time difference between $t_1$ and $t_2$ is smaller than or equals the measured dispersion, the verifier knows for sure that the bottleneck link is located somewhere within the network domain between his own location and the location of the configured SDN switch and that his measurement was correct (and has not been tampered by the prover). Otherwise, the verifier knows that the bottleneck link is somewhere beyond the configured SDN switch, and the verifier can at least determine a lower bound of the bandwidth.

In order to enable the SDN controller to support the network measurements conducted by the verifier, the embodiments of the invention may require the cooperation of the verifier with the SDN controller. In particular, it may be provided that the verifier informs the SDN controller of the prover's IP address, in order to enable the SDN controller to properly identifying the SDN switch closest to the prover and to properly configure this SDN switch with the enqueue command.

Preferably, in order to ensure that the prover cannot predict the probe request packets, the probe request packets may contain pseudo-randomly generated payloads.

In some embodiments of the invention, the network measurements include RTT (Round Trip Time) measurements. In this context, it may be provided that the SDN controller dynamically configures a number of random paths across that SDN switches for probe request packets issued by the verifier towards the prover. Then, the verifier may conduct independent measurements of the RTT for each configured path. The number of configured paths is chosen to be at least two, preferably three or more. In case of at least three paths and corresponding independent measurements, the verifier can apply triangulation techniques which will reveal any tampering attempts of the prover.

In some embodiments of the present invention, the RTT measurements as described above may be used for securing Internet coordinate systems. In such cases the probe request packets may be generated in form of ICMP (Internet Control Message Protocol) echo request packets.

As described above, the specific capabilities of SDN network elements—controller and switches—are used in accordance with the embodiments of the present invention to provide enhanced security and reliability of network measurements. While some embodiments of the invention are described using OpenFlow controller and OpenFlow switches (i.e., to be more specific, SDN controller/switches using the OpenFlow protocol) as examples of SDN network elements, it will be understood that the methods of the invention may be used with any flow-based programmable controller/switch.

The present invention turns away from the end-to-end principle and proposes to perform network measurements with the help of infrastructural support from the network, thereby enhancing the security of the measurements. More specifically, the present invention makes use of intelligence provided by software defined networks (SDNs). These networks separate the "control plane" and the "data plane", and thus achieve a large degree of "network virtualization". OpenFlow (see for reference "OpenFlow-Enabling Innovation in your Network", available from http://www.openflow.org/) is one such protocol that enables the construction of SDNs in practice. OpenFlow is a data link layer communication protocol that enables an OpenFlow controller to configure paths, in software, through a number of OpenFlow-operated switches. Here, the controller issues routing rules to the switches using a secure control channel; the switches can then dynamically implement the requested routing rules on the data plane.

Hereinafter, by making references to the embodiments of the instant invention illustrated in the figures, it is shown how SDN networks, in particular Open Flow-operated networks, can strengthen the security of bottleneck bandwidth estimation processes and of RTT measurements. In connection with the illustrated embodiments the extent to which SDNs (and OpenFlow-operated switches) can help in securing network measurements is described, thereby focusing on securing end-to-end bottleneck bandwidth estimations and on securing end-to-end RTT measurements.

First, the underlying system and attacker model is outlined as follows:

While they might be different in purpose and technique, most active end-to-end measurement tools share a similar system model consisting of a verifier and a prover connected by a network. The verifier wants to measure and verify the end-to-end performance of the path to the prover. The verifier actively generates probe packets—hereinafter denoted probe request packets—destined to the prover, who appropriately echoes back its probe packets—hereinafter denoted probe reply packets—to the verifier. The verifier then estimates the performance of the end-to-end path to the prover by extracting and analyzing the probe packets' arrival times depending on the measurement technique in question.

While an external attacker can spoof the IP address of the prover and issue back replies on its behalf (see, for instance, B. Harris and R. Hunt: "TCP/IP security threats and attack methods", in Computer Communications, 1999), untrusted provers constitute the core of the present underlying internal attacker model. Untrusted provers denote those hosts involved in the measurement process, but they are not trusted by the verifier to correctly execute the measurement steps. Untrusted provers can intentionally manipulate the sending time of their reply probes and claim a measurement value of their choice.

Referring now to FIG. 1, this figure illustrates a setting where a path (as illustrated by the dashed lines) between a verifier 1 and a prover 2 traverses a network domain 3 that is governed by an SDN controller 4, operated as an OpenFlow controller 5. Also, a number of SDN switches 6, operated as OpenFlow switches 7, 8, are implemented within the network domain 3. It is further assumed that the OpenFlow controller 5 cooperates with the verifier 1 (which might be, e.g., the network operator) in order to ensure the security of the conducted measurements.

OpenFlow is only one specific protocol that may be employed and that the described embodiment may be realized with any SDN controller/switch using protocols other than OpenFlow. In any case, it is important to note that in contrast to conventional networks, software defined networks (SDN's), such as OpenFlow, along with virtualization technologies on switches, offer immense flexibility both in terms of defining and monitoring the network state. For example, within the OpenFlow paradigm, the network is completely controlled by a controller entity, i.e. the OpenFlow controller 5, which communicates with network elements that also understand the OpenFlow protocol, i.e. with the OpenFlow switches 7. The network traffic is controlled by a set of programmable traffic forwarding rules, which map incoming packets on a switch port to the outgoing switch port within an instance of a switch (either physical or virtual). Thus, the OpenFlow protocol has built-in functionality for forwarding traffic. At any given time, the controller entity in an OpenFlow network has a detailed view of the network state, which is built by exchanging control messages between the controller and various network elements, in particular OpenFlow switches. These capabilities of OpenFlow controllers/switches (or, more generally, of SDN controllers/switches) are used in accordance with embodiments of the present invention to enhance the security of network measurements without altering widely used network architectures or protocols.

FIG. 1 relates to a preferred embodiment of the invention that leverages OpenFlow and enables the secure estimation of the bottleneck bandwidth of the prover 2. It is assumed that the verifier 1 measures the bottleneck bandwidth of the path to the prover 2 using the packet-pair technique. More specifically, to measure the upload bandwidth of the path to the prover 2, the verifier 1 sends two back to back request packets of small size (e.g., 40 bytes) to the prover 2. These packets contain pseudo-randomly generated payloads in order to ensure that the prover 2 cannot predict them. Within their headers these packets encapsulate a predefined flag, e.g., in the ToS (Type of Service) field. This flag serves to announce to the Open Flow-operated switches 7 on the path to the prover 2 that the packets correspond to bandwidth measurement packets.

Upon reception of these packets at the prover 2, the prover 2 sends two back to back large echo replies (e.g., of 1500 byte each) to the verifier 1. Since these probe reply packets are large in size, they are likely to queue at the bottleneck link, thus ensuring that their dispersion is inversely proportional to download bottleneck bandwidth of the path (as described in K. Lai, M. Baker: "Measuring link bandwidths using a deterministic model of packet delays", in Proceedings of ACM SIGCOMM 2000). However, generally this kind of network measurements can be severely disturbed and manipulated by the prover 2, who can artificially insert delays within the transmission of the probe reply packets in order to alter its bandwidth claims and prevent the queuing of the packets.

To ensure that the prover 2 does not tamper with the measurements, the verifier 1 informs the OpenFlow controller 5 about the IP address of the prover 2 (as indicated by the solid line arrow denoted "IP"). The OpenFlow controller 5 then propagates a rule to the OpenFlow switch 8 closest to the prover 2 (as indicated by the solid line arrow denoted "Enqueue Command") requesting to queue all the packets that it receives from the prover's 2 IP address, whose header contain a measurement flag.

In addition, the OpenFlow controller 5 requests that the selected OpenFlow switch 8 forwards the packet-pair, along with their received timestamps, $t_1$ and $t_2$, to the OpenFlow controller 5. The OpenFlow controller 5 automatically sends $t_1$ and $t_2$ to the verifier 1.

Let disp denote the dispersion between the packets measured by the verifier 1, and let $d=(t_2-t_1)$. Here, two cases emerge:

d<=disp. In this case, the verifier 1 can be certain that the measurement is correct since the bottleneck link is located after the OpenFlow switch 8, i.e. somewhere on the path between the OpenFlow switch 8 and the verifier 1.

disp<d. In this case, the bottleneck link is before the OpenFlow switch 8 and the verifier 1 can at least measure (on the basis of the measured dispersion d) a lower bound on the bandwidth of the prover 2.

Given this, the closer (in number of hops) is the prover 2 to the network domain 3, the more accurate is the estimate acquired by the verifier 1. That is, the smaller is the number of hops that separate the prover 2 from the outermost OpenFlow switch 8, the higher is the probability that the bottleneck link is located after the OpenFlow switch 8, i.e. within the network domain 3 itself. This conforms with recent studies that show that bottleneck links typically coexist within inter-domains links (see for reference N. Hu, L. E. Li, Z. M. Mao, P. Steenkiste, and J. Wang: "A Measurement Study of Internet Bottlenecks", in Proceedings of INFOCOM, 2005).

Figure 2:
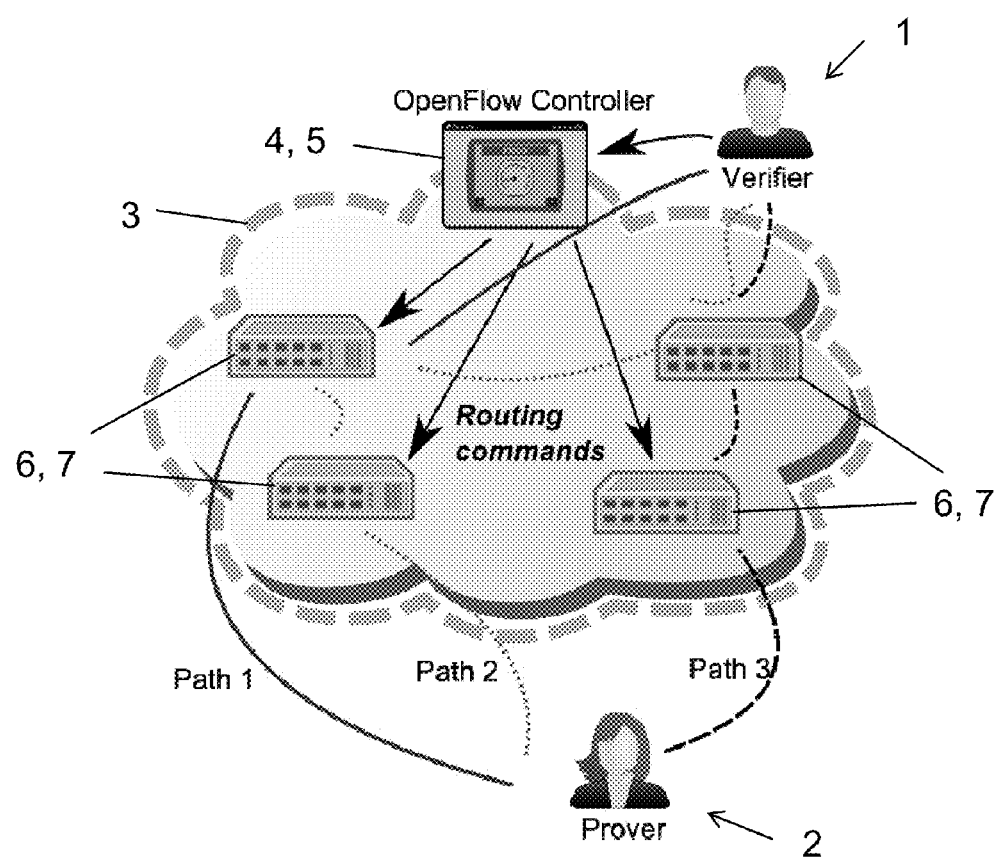
FIG. 2 shows a schematic view illustrating an application scenario of secure RTT measurements in accordance with an embodiment of the invention.

Referring now to FIG. 2, in which like reference characters generally refer to the same parts and components as in FIG. 1, this figure illustrates an embodiment of the present invention related to securing RTT measurements.

In this regard, it is referred to M. A. Kaafar, L. Mathy, T. Turletti, and W. Dabbous: "Virtual Networks under Attack: Disrupting Internet Coordinate Systems", in Proceedings of CoNext, 2006, in which authors propose the reliance on trusted surveyor nodes to secure Internet coordinate systems. In connection with the embodiment illustrated in FIG. 2, it is shown that SDNs can also be used to secure such Internet coordinate systems by detecting delay attacks on RTT measurements. In this context, it is assumed that the prover 2 is interested in claiming a specific RTT distance to the verifier 1, e.g., in order to be optimally placed in a content distribution tree.

In order to detect such misbehavior on the side of the prover 2, the verifier 1 specially-crafts its probe request packets, which—in the context of Internet coordinate systems—are also known as ICMP (Internet Control Message Protocol) echo request packets. In particular, the verifier 1 ensures that the content of the ICMP echo request packets cannot be predicted (in order to prevent rushing attacks) and inserts a flag in their header field (e.g., in the ToS field). Given the IP address of both the prover 2 and the verifier 1, the OpenFlow controller 5 then dynamically configures a random path (across the OpenFlow switches 6, 7) for the ICMP echo request packets issued by the verifier 1 along the path to the prover 2. This process is repeated for a number of independent measurements, in which the verifier 1 measures the RTT of each configured path. The different path may be created by the OpenFlow controller 5 installing dedicated routing commands within the OpenFlow switches 6, 7, for instance, by addressing certain switch ports by means of random-based modulo rules.

In FIG. 2, this process is illustrated for three different paths, indicated by solid lines, dashed lines, and dotted lines. It is noted that between the last OpenFlow switches 6, 7 within network domain 3 and the prover 2, in practice, the paths will include further network elements located in other network domains, which have been omitted in FIG. 2 for the sake of simplicity.

Since the prover 2 cannot predict the paths that the ICMP packets will follow to the verifier 1, it is easy to see that the prover 2 cannot insert the accurate amount of delays in order to claim an RTT distance of its choice to the verifier 1 without being detected. At least when the number of paths configured by the OpenFlow controller 5 is three or more, in which case the verifier 1 may apply triangulation techniques, effectively the prover 2 will always end up claiming a number of different RTT locations. A detailed reasoning of this effect is described in S. Capkun, K. B. Rasmussen, M. Cagalj and M. Srivastava: "Secure Location Verification With Hidden and Mobile Base Stations", in IEEE Transactions on Mobile Computing, 2008. Clearly, the bigger is the network domain 3, the larger are the amounts of OpenFlow switches 6, 7, and the harder it becomes for the prover 2 to predict the path to the verifier 1. Here, the prover 2 does not have to be located in the proximity of network domain 3.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of performing secure network measurements between a verifier and a prover, the method comprising:
    generating, by the verifier, probe request packets destined to the prover, and
    echoing, by the prover, corresponding probe reply packets back to the verifier,
    wherein a path between the verifier and the prover traverses a network domain that includes at least one software defined network (SDN) controller and one or more SDN switches, and
    wherein tampering of the network measurements by the prover is avoided by selectively influencing the probe request packets sent by the verifier and/or the probe reply packets sent by the prover according to programmable packet forwarding rules that the at least one SDN controller implements on the one or more SDN switches.

2. The method according to claim 1, wherein the programmable packet forwarding rules are directed at selectively controlling routing and/or temporal behavior of the probe request packets sent by the verifier and/or the probe reply packets sent by the prover.

3. The method according to claim 1, wherein the network measurements include bottleneck bandwidth estimations.

4. The method according to claim 1, wherein the verifier sends two equally sized probe request packets back to back to the prover and the prover echoes two equally sized probe reply packets back to the verifier, wherein a size of the probe reply packets is larger than a size of the probe request packets.

5. The method according to claim 1, wherein the SDN controller propagates a first one of the packet forwarding rules to a closest SDN switch of the one or more SDN switches that is closest to the prover to instruct the closest SDN switch to queue all probe reply packets that the closest SDN switch receives from the prover.

6. The method according to claim 5, wherein the verifier sends two equally sized probe request packets back to back to the prover and the prover echoes two equally sized probe reply packets back to the verifier, wherein a size of the probe reply packets is larger than a size of the probe request packets, and wherein arrival times $t_1$, $t_2$ of the two probe reply packets at the closest SDN switch are reported to the verifier.

7. The method according to claim 6, wherein the verifier, upon receiving the two probe reply packets from the prover, compares observed dispersion between the two probe reply packets against the arrival times $t_1$, $t_2$ of the two probe reply packets at the closest SDN switch.

8. The method according to claim 1, wherein the verifier informs the SDN controller of the prover's IP address.

9. The method according to claim 1, wherein the probe request packets contain pseudo-randomly generated payloads.

10. The method according to claim 1, wherein the network measurements include RTT (Round Trip Time) measurements.

11. The method according to claim 1, wherein the SDN controller dynamically configures a number of random paths across the SDN switches for the probe request packets issued by the verifier towards the prover.

12. The method according to claim 11, wherein the verifier conducts independent measurements of RTT (Round Trip Time) for each of the configured random paths.

13. The method according to claim 11, wherein the number of the configured random paths is at least two.

14. The method according to claim 1, wherein the probe request packets are generated as ICMP (Internet Control Message Protocol) echo request packets.

15. The method according to claim 1, wherein the SDN controller and the SDN switches are configured to use OpenFlow protocol.

16. A system for performing secure network measurements between a verifier and a prover, wherein the verifier is configured to generate probe request packets destined to the prover and the prover is configured to echo corresponding probe reply packets back to the verifier, the system comprising:
    at least one software defined network (SDN) controller and one or more SDN switches located in a network domain through which a path between the verifier and the prover traverses,
    wherein the at least one SDN controller is configured to implement on the one or more SDN switches programmable packet forwarding rules which to avoid tampering of the network measurements by the prover by selectively influencing the probe request packets sent by the verifier and/or the probe reply packets sent by the prover according to the programmable packet forwarding rules.

17. The system according to claim 16, wherein the SDN controller and the SDN switches are configured to use OpenFlow protocol.

* * * * *